(12) United States Patent
Xiao et al.

(10) Patent No.: US 7,852,770 B2
(45) Date of Patent: Dec. 14, 2010

(54) METHOD AND APPARATUS FOR INTERACTION AMONG RESOURCE RESERVATION PROTOCOL NODES

(75) Inventors: Qingsong Xiao, Shenzhen (CN); Bin Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 22 days.

(21) Appl. No.: 12/328,930

(22) Filed: Dec. 5, 2008

(65) Prior Publication Data

US 2009/0080450 A1   Mar. 26, 2009

Related U.S. Application Data

(63) Continuation of application No. PCT/CN2007/001672, filed on May 23, 2007.

(30) Foreign Application Priority Data

Jun. 7, 2006   (CN) .................. 2006 1 0027366

(51) Int. Cl.
*G01R 31/08* (2006.01)
(52) U.S. Cl. ..................... 370/235; 370/410
(58) Field of Classification Search ........... None
See application file for complete search history.

(56) References Cited

U.S. PATENT DOCUMENTS

| 6,778,492 | B2 * | 8/2004 | Charny et al. ......... 370/228 |
| 7,230,913 | B1 * | 6/2007 | Vasseur et al. ......... 370/216 |
| 7,359,377 | B1 * | 4/2008 | Kompella et al. ....... 370/389 |
| 7,457,233 | B1 * | 11/2008 | Gan et al. ............. 370/216 |
| 2003/0210705 | A1 * | 11/2003 | Seddigh et al. ........ 370/419 |
| 2005/0188100 | A1 * | 8/2005 | Le Roux et al. ........ 709/238 |
| 2006/0087983 | A1 | 4/2006 | Vigoureux et al. |

FOREIGN PATENT DOCUMENTS

| CN | 1735091 A | 2/2006 |
| CN | 1764130 A | 4/2006 |

OTHER PUBLICATIONS

State Intellectual Property Office of the People's Republic of China, International Search Report in International Patent Application No. PCT/CN2007/001672 (Aug. 30, 2007).
State Intellectual Property Office of the People's Republic of China, First Examination report in Chinese Patent Application No. 200610027366.3 (Jul. 11, 2008), Abstract.
State Intellectual Property Office of the People's Republic of China, Second Examination report in Chinese Patent Application No. 200610027366.3 (Jan. 15, 2010), Abstract.

* cited by examiner

*Primary Examiner*—Jayanti K Patel
*Assistant Examiner*—Hooman Houshmand
(74) *Attorney, Agent, or Firm*—Leydig, Voit & Mayer, Ltd.

(57) ABSTRACT

A RSVP node apparatus and interaction method thereof are provided. The method includes transmitting a first message to a neighboring node of a RSVP-based first node when the RSVP-based first node disables the RSVP HELLO mechanism. When the neighboring node receives the message, it sets a sign indicating that the first node has disabled the RSVP HELLO mechanism and maintains the LSP passing through the first node, according to the disabled status of the RSVP HELLO mechanism of the first node. Prior to transmitting the first message, the first node queries if the neighboring node has enabled the RSVP HELLO mechanism, and transmits the first message only to neighboring node which enables the RSVP HELLO mechanism.

10 Claims, 1 Drawing Sheet

METHOD AND APPARATUS FOR INTERACTION AMONG RESOURCE RESERVATION PROTOCOL NODES

CROSS-REFERENCE TO RELATED APPLICATIONS

This application is a continuation of International Patent Application No. PCT/CN2007/001672, filed May 23, 2007, which claims priority to Chinese Patent Application No. 200610027366.3, filed Jun. 7, 2006, both of which are hereby incorporated by reference in their entirety.

FIELD OF THE INVENTION

The present invention relates to network and communication field, more specifically, to communication method and apparatus based on resource reservation protocol.

BACKGROUND

Transmission Control Protocol/Internet Protocol (TCP/IP) based Ethernet technology, after more than 30-year development, has become a dominant local area network (LAN) technology so far. It has managed to enter the core network of the public network, root in the metropolitan area network, and is gradually penetrating into the public access network. For almost every application, Ethernet technology has actually become a standard for transmission protocol. Having the virtue of simplicity, flexibility, and low cost, the Ethernet technology far exceeds some traditional technologies, such as Token Ring, Fiber Distributed Data Interface (FDDI), and Asynchronous Transfer Mode (ATM).

With the development of Ethernet based LAN and Ethernet switching technology, virtual local area network (VLAN) technology pops up. VLAN, defined by Institute of Electronic Electrical Engineering (IEEE), is a technology for LAN partition established based on LAN switch.

Meanwhile, it is desirable for the IP network to not only provide the traditional e-mail service, internet-surfing service, etc., but also provide point-to-point forward control service, etc. Multi-Protocol Label Switching (MPLS), developed based on IP technology, is a technology that incorporates the ATM technology and a technology that is based on a label between the link layer header and network layer header for accelerating the forward operation. MPLS is capable of combining various network technologies and link layer technologies. It allows extensive applications in the fields of Virtual Private Networking (VPN), Traffic Engineering (TE), Quality of Service (QoS), etc., at present.

The building block for MPLS network is a downstream label switch router (LSR). The network, constituted by LSRs, is called MPLS domain. The LSR which is located along the edge of MPLS domain and couples to other user network is called edge LSR. The LSR which locates inside the MPLS domain is called core LSR. The core LSR may be a router supporting for MPLS, or an ATM-LSR upgraded from the ATM switch, and the like. The labeled packet is transmitted along a label switched path (LSP) comprised of a series of LSRs. The LSR at entry is called "Ingress," while the LSR at exit is called "Egress." For instance, a path connected by LSR device 2, 3, 4, and 5 is a LSP. The entry to the LSP is LSR device 2. The exit to the LSP is LSR device 5.

MPLS is vital to the realization of Traffic Engineering. It may accomplish various traffic engineering functions accomplished by other models. Moreover, it is cost effective, and more importantly, it may automate part of the traffic engineering functions. Currently, MPLS TE is implemented with the support of Resource Reservation Protocol (RSVP)-TE. It extends the TE based on RSVP. In RSVP-TE, there are two main messages, PATH and RESV. Both of them are the extension of corresponding messages in the RSVP. RSVP-TE provides MPLS TE with a configurable display path and a LSP whose bandwidth can be reserved. Moreover, the RSVP-TE supports swift re-routing, preemption, and loop detection for LSP.

In the existing RSVP network, RSVP node utilizes a RSVP HELLO mechanism to check the reachability of a neighboring node. Such mechanism provides a point-to-point error check. If the RSVP node detects that its neighboring node has been lost, it handles such situation according to the practice conducted when the link layer communication fails. Such mechanism is generally used in the scenario where link check is not available or not on time.

Specifically, RSVP HELLO mechanism includes two types of messages, "HELLO REQUEST" and "HELLO ACK." Any RSVP node which enables the RSVP HELLO mechanism will send a "HELLO REQUEST" message at regular interval, which is set by configuration or by default. The node receiving the HELLO REQUEST message replies a HELLO ACK message in return. Both two types of messages include two fields "Src_Instance" and "Dst_Instance." Node check is accomplished by collecting/storing the instance value of the neighboring node.

RSVP Node A fills the Src_Instance field of the HELLO REQUEST message with a value which represents the node itself and corresponds to a neighboring node when transmitting the HELLO REQUEST message. For instance, suppose Node A has two neighboring Nodes B and C. Node A fills Src_Instance field with A1 in the HELLO REQUEST message transmitted to B, and fills Src_Instance field with A2 in the HELLO REQUEST message transmitted to C. The filled value remains unchanged when exchanging the HELLO message with its corresponding neighboring node. In addition, the value of Src_Instance field in the latest HELLO message received from the corresponding neighboring node is used to fill in the Dst_Instance field in the REQUEST message. If Node A has never received the HELLO message from the neighboring node or the neighboring node is deemed as lost, the value of Src_Instance field is stored locally as zero.

After receiving the HELLO REQUEST message from Node A, RSVP Node B compares the value of Src_Instance field in the message with the locally stored value of Src_Instance field which is received most recently. If Node B has never received the HELLO message from Node A; that is, the locally stored value of the Src_Instance field concerning the neighboring node (Node A) is zero, then the locally stored value of the Src_Instance field concerning the corresponding neighboring node is updated. If two Src_Instance field values are different, or the Src_Instance field value in the current received message is zero, then neighboring Node A transmitting the message is deemed as lost. If two Src_Instance field value are identical, Node B returns a corresponding HELLO ACK message.

RSVP Node B receives the HELLO REQUEST message from neighboring Node A and compares the Dst_Instance in the received message with the Src_Instance sent recently. If they are different, it is determined that an error occurred upon the neighboring Node A. If the neighboring Node A continuously sends REQUEST message containing incorrect and non-zero Dst_Instance value, the neighboring node A is deemed as lost.

After Node B determines that two Src_Instance field values are identical and returns a HELLO ACK message, the corresponding neighboring Node A receives the returned the HELLO ACK message and compares the Src_Instance field value in the message with the Src_Instance field value received from B most recently. If different, the neighboring Node B is deemed as lost. Then, Node A compares the Dst_Instance field value with the Src_Instance field value transmitted to neighboring Node B most recently. If different, the neighboring Node B is also deemed as lost.

If the SVP node has neither received the HELLO REQUEST message from neighboring node nor received the HELLO ACK message from the neighboring node for several consecutive periods (configurable), the neighboring node is also deemed as lost.

If the RSVP node detects that its neighboring node is lost, the neighboring node is handled according to the practice conducted when the link layer communication fails.

In practice, according to the foregoing approach, the neighboring node may not be able to make correct determination on whether or not the RSVP node is lost under the circumstance when the RSVP node disables the RSVP HELLO mechanism.

The reason for that is the neighboring RSVP node, according to in the prior art, utilizes the RSVP HELLO mechanism to check the availability of its counterpart. After transmitting the HELLO REQUEST message to the neighboring RSVP node, a determination is made on whether or not the neighboring node is lost, according to the HELLO ACK feedback message from the neighboring node. However, such method of determination may get a correct result only when all of the RSVP nodes enable the RSVP HELLO mechanism. Once any one of the nodes disables the RSVP HELLO mechanism, this node would not return the HELLO ACK message after receiving the HELLO REQUEST message from its neighboring node. However, this node is not lost in fact. In this case, because its neighboring could not receive the HELLO ACK message, the neighboring node may not be able to make determination on whether the RSVP node is lost or not, or may get an incorrect result of the determination. For instance, RSVP node is likely to make the determination that the neighboring node is lost when the RSVP node has not received the HELLO ACK message from some neighboring node for several consecutive periods. The network side then handles the neighboring node according to the practice conducted when the link layer communication fails, mistakenly removes the LSP passing through the neighboring node, and, thus, results in the interruption in the LSP.

SUMMARY

Various embodiments of the present invention provide a method and apparatus for interaction among the RSVP nodes so that a label exchanging path (LSP) in normal condition can be maintained, when the RSVP node disables the RSVP HELLO mechanism.

A method for interaction among RSVP nodes according to one embodiment of the present invention includes receiving, by a node, a first message sent from an RSVP-based first node which neighbors on the node when the first node disables a RSVP HELLO mechanism. The first message carries information indicating that the first node has disabled the HELLO mechanism.

The method further includes setting, by the node, a sign indicating that the first node has disabled the HELLO mechanism; and maintaining a label switching path passing through the first node according to the disabled status of the RSVP HELLO mechanism of the first node.

A node apparatus according to an embodiment of the present invention includes a transmission unit, a configuration unit, and a processing unit.

The transmission unit is adapted to send a message carrying information indicating that a RSVP HELLO mechanism has been disabled to a neighboring node when the HELLO mechanism is disabled;

The configuration unit is adapted to set a sign indicating that the neighboring node has disabled the HELLO mechanism when receiving the message carrying the information of the disabling of the HELLO mechanism from the neighboring node; and The processing unit is adapted to maintain a label switch path passing through the neighboring node based on the status indicating whether or not the neighboring node has disabled the HELLO mechanism according to the sign set by the configuration unit.

According to the technical solutions provided by the embodiments of the present invention, when the RSVP-based first node disables the RSVP HELLO mechanism, it transmits a first message to inform a neighboring node of the first node. When the neighboring node receives the message, the neighboring node configures a sign representing that the first node has disabled the RSVP HELLO mechanism, and maintains the LSP passing through the first node, according to the disabled status of the RSVP HELLO mechanism of the first node. The present invention ensures that the neighboring node can be informed of the disabled status of the RSVP HELLO mechanism of the first node in time, and avoids the situation that the neighboring node mistakenly regards the first RSVP node as having been lost and, thus, deletes the LSP passing through the first node when the neighboring node has not received the HELLO REQUEST or HELLO ACK from the first RSVP node for several periods. Accordingly, the normal working state for the LSP can be ensured.

Prior to transmitting the first message, the first node queries the neighboring node if the RSVP HELLO function is enabled. The first node transmits the first message only to the neighboring node which has enabled the RSVP HELLO function such that the times of transmission of the first message is minimized, thereby saving the system resource.

For the neighboring node, the sign, representing whether or not the first node has disabled the RSVP HELLO function, may be a predetermined value of Src_Instance. If the Src_Instance is set to zero, the first message becomes the HELLO ACK message which fills the Src_Instance field with the predetermined value (e.g. 0). As such, the present invention may well combine the prior arts.

DETAILED DESCRIPTION

The purpose, technical solutions and advantages concerning the embodiments of the present invention will become more readily appreciated by reference to the following description of the embodiments, when taken in conjunction with the accompanying drawings.

The method for interaction among RSVP nodes according to embodiments of the present invention is illustrated below.

Figure 1:
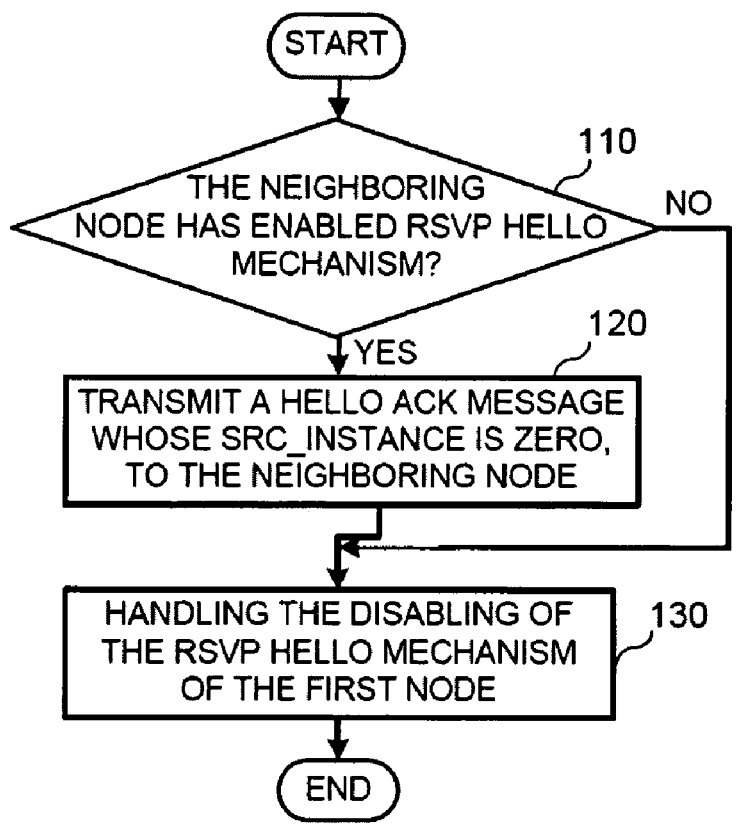
FIG. 1 is a flowchart of transmitting message during interaction among the RSVP nodes, according to an embodiment of the present invention.

As illustrated in FIG. 1, the interaction among RSVP nodes is described below.

At Step 110, when a RSVP-based first node needs to disable the RSVP HELLO mechanism, the first node determines if its neighboring node has enabled the RSVP HELLO mechanism. If the neighboring node has enabled RSVP HELLO mechanism, the method proceeds to Step 120. Otherwise, the transmission of the first message is ignored, and the method proceeds to Step 130 directly.

At Step 120, the first node sends a first message to the neighboring node which enables the RSVP HELLO mechanism and informs the neighboring node that the first node disables the RSVP HELLO mechanism.

Specifically, according to the present embodiment, if the value of Src_Instance in the HELLO ACK message is pre-set as zero, it means that the RSVP node has disabled the RSVP HELLO mechanism. Therefore, in this step, the first node transmits the HELLO ACK message whose Src_Instance field is filled with zero (which is also referred to as the first message) to the neighboring node which enabled the RSVP HELLO mechanism, so as to inform the neighboring node that the first node has disabled RSVP HELLO mechanism. By checking in advance if the neighboring node has enabled the RSVP HELLO mechanism, the first message is sent only to the neighboring node which has enabled the RSVP HELLO function. As such, the times of transmission of the first message are minimized and the system resources are saved. Because the first message is the HELLO ACK message whose Src_Instance has a predetermined value (e.g. 0), only minor modifications to the prior art are made according to the present invention to achieve the goal of the present invention for a better combination of prior arts.

At Step 130, the first node handles the disabling of RSVP HELLO mechanism. The implementation is similar to that of the prior art, which is omitted herein for brevity.

Figure 2:
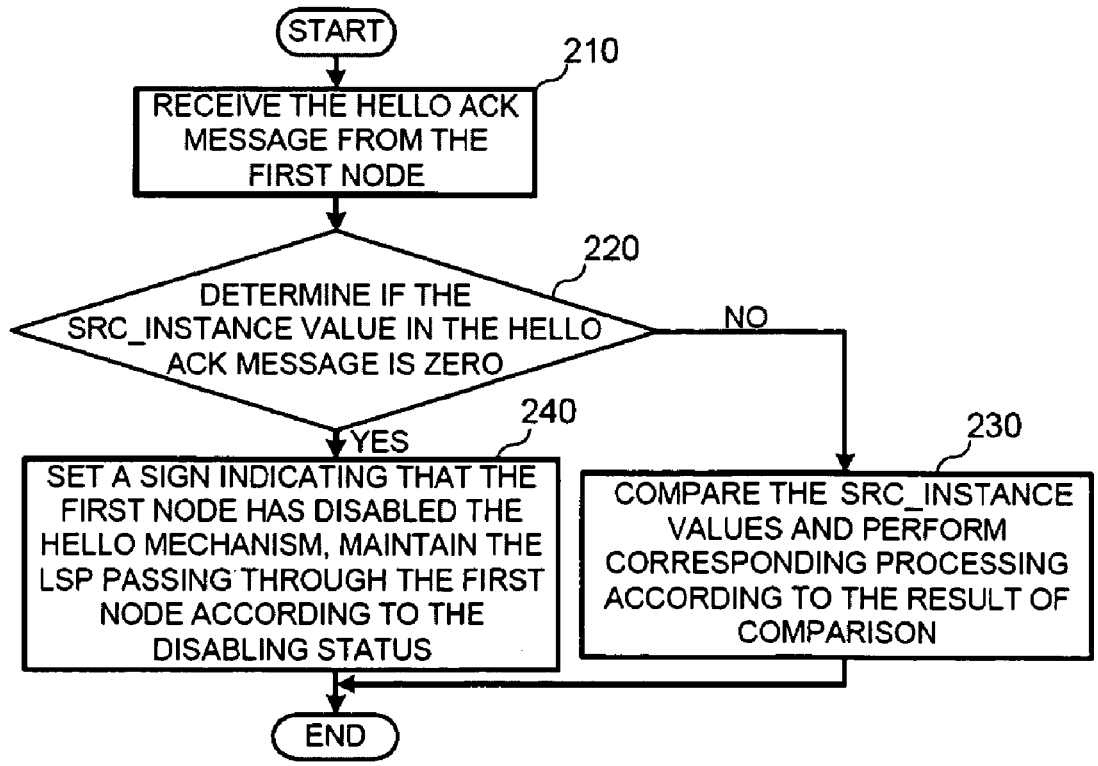
FIG. 2 is a flowchart of receiving message during interaction among the RSVP nodes, according to an embodiment of the present invention.

With respect to the foregoing example, when the neighboring node of the first node receives the HELLO ACK message from the first node, corresponding operations are performed, as illustrated in FIG. 2. The operations include the following steps.

At Step 210, after the RSVP HELLO-enabled neighboring node receives the HELLO ACK message from the first node, the operation proceeds with Step 220 where a determination is made on whether or not the value of Src_Instance in the HELLO ACK message is zero. If the value is zero, the operation proceeds with step 240. Otherwise, the operation proceeds with Step 230. The locally stored Src_Instance of the first node and the received Src_Instance are compared according to prior art and a corresponding processing is done based on the comparison result, which is herein omitted for brevity.

At Step 240, since the Src_Instance value in the HELLO ACK message received by the neighboring node from the first node is zero, the neighboring node determines that the first node has disabled the RSVP HELLO mechanism. The neighboring node sets a local sign representing that the first node has disabled the RSVP HELLO mechanism, and maintains the LSP passing through the first node, according to the disabled status of the RSVP HELLO mechanism of the first node.

Specifically, after the neighboring node determines that the first node has disabled the RSVP HELLO mechanism, the locally stored value of Src_Instance of the first node is pre-set to zero to identify that the first node has disabled the RSVP HELLO mechanism. The first node which has disabled the RSVP HELLO mechanism shall not be regarded as lost even if the HELLO ACK message of this node may not be received after the HELLO REQUEST message is transmitted to this node, or the HELLO REQUEST message has not received from the first node after a predetermined time period. Rather, the LSP passing through the first node shall be maintained, according to the disabled status of the RSVP HELLO mechanism of the first node.

In other words, if the neighboring node has not received any HELLO message from the first node in a predetermined time period, the neighboring node then determines if the locally stored value of the Src_Instance of the first node is zero. If the value is zero, the normal status of the LSP passing through the first node is maintained. Otherwise, the node is deemed as lost and the LSP passing through the first node may be removed. By identifying in the neighboring node if the first node has enabled the RSVP HELLO mechanism and maintaining the LSP passing through the first node, according to the status indicating if the first node has disabled or enabled the RSVP HELLO mechanism, the removal of the LSP passing through the first node due to a mistaken judgment of the loss of the first node which has disabled the RSVP HELLO mechanism can be avoided. Accordingly, the LSP interruption of the first node caused by the disabling of RSVP HELLO mechanism of the first node can be prevented effectively. Therefore, the network performance is improved.

The first node and the first message in the embodiments of the present invention are introduced for ease of description rather than an indication of any order of the node or message. The first node and the first message herein are used to refer to a specific node or message. For instance, a first node may be an arbitrary node in the network. Once the node is specified, it is referred to as the first node. Further, for instance, a first message may be any specified known message or defined message in the network. Once the message is specified, it is referred to as the first message.

The RSVP-based nodes of the second embodiment of the present invention includes a Device 1 adapted to send a first message to inform a neighboring node, a Device 2 adapted to set a sign representing that the neighboring node has disabled the RSVP HELLO mechanism, and a Device 3 adapted to maintain a LSP passing through the neighboring node according to the status indicating if the neighboring node has disabled the RSVP.

Specifically, when the first RSVP node needs to disable the RSVP HELLO mechanism, Device 1 determines if it neighboring node has enabled the RSVP HELLO mechanism and sends a first message indicating that the node has disabled the RSVP HELLO mechanism, to the RSVP HELLO-enabled neighboring node. When the neighboring node receives the first message from the first RSVP node, Device 2 configures locally the sign representing the first RSVP node has disabled the RSVP HELLO mechanism and Device 3 maintains the LSP passing through the first node according to the status indicating if the first RSVP node has disabled the RSVP HELLO mechanism. The embodiment ensures that the neighboring node can be informed of the status indicating whether the first RSVP node has disabled the RSVP HELLO mechanism in time and avoids the situation that the neighboring node mistakenly regards the first RSVP node as having been lost and, thus, deletes the LSP passing through the first node when the neighboring node has not received the HELLO REQUEST or HELLO ACK of the first RSVP node for several periods from the first RSVP node. Accordingly, a normal work condition for the LSP can be ensured. Prior to transmitting the first message, the first RSVP node queries the neighboring node if the RSVP HELLO function is enabled. The first node transmits the first message only to the neighboring node which has enabled the RSVP HELLO function such that the times of transmission of the first message is minimized, thereby saving the system resource.

Device 1, Device 2 and Device 3 referred by the second embodiment are logic concepts. Physically, they may be implemented on different apparatuses or in a same apparatus. Various names may be used for Device 1, Device 2 and Device 3. No matter what names are given, the effect of the present invention may be achieved as long as they include the foregoing functionality. It is appreciated that the function concerning Device 1, Device 2 and Device 3 are mainly used to determine and configure the value of variables, and to transmit the message.

Illustration and description of the present invention are made by reference to the embodiments of the present invention. However, it is understood by those skilled in the art that any modifications, variations, and equivalents made without departing from the spirit and scope of the present invention fall within the scope of the claimed invention.

What is claimed is:

1. A method for interaction among resource reservation protocol (RSVP) nodes, comprising:
   determining, by a first node, whether a neighboring node has enabled a RSVP HELLO mechanism when the first node needs to disable the first node's RSVP HELLO mechanism;
   sending, by the first node, a first message to a neighboring node with the RSVP HELLO mechanism enabled, wherein the first message is a HELLO Acknowledgment (ACK) message carrying a Source(Src)_Instance field filled with a predetermined value;
   receiving, by the neighboring node, the first message sent from the first node;
   setting, by the neighboring node, a sign in the neighboring node indicating that the first node has disabled the HELLO mechanism, wherein the sign is a locally stored value of the Src_Instance field corresponding to the first node and the locally stored value equals the predetermined value;
   judging, by the neighboring node, whether the locally stored value of the Src_Instance field corresponding to the first node equals the predetermined value when the neighboring node has not received a HELLO message from the first node for a predetermined time period;
   maintaining, by the neighboring node, a label switching path passing through the first node in a normal state according to the disabled status of the HELLO mechanism of the first node if the Src_Instance field value equals the predetermined value; and
   removing, by the neighboring node, the label switching path passing through the first node if the Src_Instance field value does not equal the predetermined value.

2. The method of claim 1, wherein before the first node sends the first message, the method further comprises:
   ignoring, by the first node, the transmission of the first message if the neighboring node has not enabled the RSVP HELLO mechanism.

3. The method of claim 1, wherein the predetermined value equals to zero.

4. The method of claim 1, further comprising: disabling, by the first node, the first node's RSVP HELLO mechanism after sending the first message to the neighboring node.

5. The method of claim 1, wherein the neighboring node has not received a HELLO message from the first node in a predetermined time period, comprises: the neighboring node having not received the HELLO ACK message from the first node after a HELLO REQUEST message is transmitted in the predetermined time period, or the neighboring node having not received the HELLO REQUEST message in the predetermined time period.

6. A node apparatus, comprising:
   a first unit configured to receive a message sent from a neighboring node, wherein the message is a HELLO Acknowledgment (ACK) message carrying a Source (Src)_Instance field filled with a predetermined value;
   a configuration unit configured to set a sign indicating that the neighboring node has disabled the reservation protocol (RSVP) HELLO mechanism when receiving the message carrying the Src_Instance field filled with the predetermined value, wherein the sign is a locally stored value of the Src_Instance field corresponding to the first node and the locally stored value equals the predetermined value; and
   a processing unit ccording to the sign set by the configuration unit configured to judge whether a locally stored value of the Src_Instance field equals the predetermined value when the processing unit has not received a HELLO message from the neighboring node in a predetermined time period, wherein if the Src_Instance field value in the message from the neighboring node equals the predetermined value, the processing unit maintains a label switching path passing through a neighboring node in a normal state and if the Src_Instance field value in the message from the neighboring node does not equal the predetermined value, the processing unit removes the label switching path passing through the neighboring node.

7. A system, comprising a first node and a neighboring node of the first node, wherein:
   the first node is configured to (1) determine whether the neighboring node has enabled a reservation protocol (RSVP) HELLO mechanism when the first node needs to disable the first node's RSVP HELLO mechanism and (2) send a first message to a neighboring node with the RSVP HELLO mechanism enabled, wherein the first message is a HELLO Acknowledgment (ACK) message carrying a Source(Src)_Instance field filled with a predetermined value; and
   the neighboring node is configured to receive the first message sent from the first node, is configured to (1) set a sign in the neighboring node indicating that the first node has disabled the HELLO mechanism and (2) judge whether a locally stored value of the Src_Instance field equals the predetermined value when the processing unit has not received a HELLO message from the neighboring node in a predetermined time period, wherein if the Src_Instance field value in the message from the neighboring node equals the predetermined value, the processing unit maintains a label switching path passing through a neighboring node in a normal state and if the Src_Instance field value in the message from the neighboring node does not equal the predetermined value, the processing unit removes the label switching path passing through the neighboring node.

8. The system of claim 7, wherein the predetermined value equals to zero.

9. The system of claim 7, wherein the first node is further configured to disable the first node's RSVP HELLO mechanism after sending the first message to the neighboring node.

10. The system of claim 7, wherein the neighboring node has not received a HELLO message from the first node in a predetermined time period, comprises: the neighboring node having not received the HELLO ACK message from the first node after a HELLO REQUEST message is transmitted in the predetermined time period, or the neighboring node having not received the HELLO REQUEST message in the predetermined time period.

* * * * *

UNITED STATES PATENT AND TRADEMARK OFFICE
CERTIFICATE OF CORRECTION

| | | |
|---|---|---|
| PATENT NO. | : 7,852,770 B2 | Page 1 of 1 |
| APPLICATION NO. | : 12/328930 | |
| DATED | : December 14, 2010 | |
| INVENTOR(S) | : Xiao et al. | |

It is certified that error appears in the above-identified patent and that said Letters Patent is hereby corrected as shown below:

On the title page, inventor WU's first name should read -- "Bing".

Column 8, lines 14-15, remove the words -- ccording to the sign set by the configured unit --.

Signed and Sealed this
First Day of February, 2011

David J. Kappos
*Director of the United States Patent and Trademark Office*